(12) United States Patent
Wang et al.

(10) Patent No.: US 8,041,891 B2
(45) Date of Patent: Oct. 18, 2011

(54) METHOD AND SYSTEM FOR PERFORMING RAID LEVEL MIGRATION

(75) Inventors: Jianning Wang, Kennesaw, GA (US); Anuj Jain, Duluth, GA (US)

(73) Assignee: LSI Corporation, Milpitas, CA (US)

( * ) Notice: Subject to any disclaimer, the term of this patent is extended or adjusted under 35 U.S.C. 154(b) by 573 days.

(21) Appl. No.: 12/172,384

(22) Filed: Jul. 14, 2008

(65) Prior Publication Data
US 2010/0011162 A1    Jan. 14, 2010

(51) Int. Cl.
*G06F 12/00* (2006.01)
*G06F 13/00* (2006.01)
*G06F 13/28* (2006.01)

(52) U.S. Cl. .......................... 711/114; 711/162
(58) Field of Classification Search .............. 711/114, 711/162
See application file for complete search history.

(56) References Cited

U.S. PATENT DOCUMENTS

| | | | |
|---|---|---|---|
| 2004/0210731 A1* | 10/2004 | Chatterjee et al. | 711/165 |
| 2005/0138286 A1* | 6/2005 | Franklin et al. | 711/114 |
| 2005/0198450 A1* | 9/2005 | Corrado et al. | 711/162 |
| 2007/0028044 A1* | 2/2007 | Hetrick et al. | 711/114 |

* cited by examiner

*Primary Examiner* — Jared Rutz
*Assistant Examiner* — Ryan Bertram
(74) *Attorney, Agent, or Firm* — Daniel J. Santos

(57) ABSTRACT

A RAID level migration system and method are provided that enable RAID level migration to be performed without the use of a hardware RAID controller with NVRAM for storing the migration parameters. Eliminating the need for a hardware controller having NVRAM significantly reduces the costs associated with performing RAID level migration. The system and method are capable of migrating from any arbitrary RAID level to any other arbitrary RAID level.

20 Claims, 8 Drawing Sheets

METHOD AND SYSTEM FOR PERFORMING RAID LEVEL MIGRATION

TECHNICAL FIELD OF THE INVENTION

The invention relates generally to data storage systems and, more particularly, to a method and system for migrating a Redundant Array of Inexpensive Disks (RAID) system from one RAID level to another RAID level.

BACKGROUND OF THE INVENTION

A storage array or disk array is a data storage device that includes multiple disk drives or similar persistent storage units. A storage array can allow large amounts of data to be stored in an efficient manner. A storage array also can provide redundancy to promote reliability, as in the case of a Redundant Array of Inexpensive Disks (RAID) system. In general, RAID systems simultaneously use two or more hard disk drives, referred to herein as physical disk drives (PDs), to achieve greater levels of performance, reliability and/or larger data volume sizes. The phrase "RAID" is generally used to describe computer data storage schemes that divide and replicate data among multiple PDs. In RAID systems, one or more PDs are setup as a RAID virtual disk drive (VD). In a RAID VD, data might be distributed across multiple PDs, but the VD is seen by the user and by the operating system of the computer as a single disk. The VD is "virtual" in that storage space in the VD maps to the physical storage space in the PDs that make up the VD, but the VD usually does not itself represent a single physical storage device. Typically, a meta-data mapping table is used to translate an incoming VD identifier and address location into a PD identifier and address location.

Although a variety of different RAID system designs exist, all have two key design goals, namely: (1) to increase data reliability and (2) to increase input/output (I/O) performance. RAID has seven basic levels corresponding to different system designs. The seven basic RAID levels, typically referred to as RAID levels 0-6, are as follows. RAID level 0 uses striping to achieve improved data reliability and increased I/O performance. The term "striped" means that logically sequential data, such as a single data file, is fragmented and assigned to multiple PDs in a round-robbin fashion. Thus, the data is said to be "striped" over multiple PDs when the data is written. Striping improves performance and provides additional storage capacity. The fragments are written to their respective PDs simultaneously on the same sector. This allows smaller sections of the entire chunk of data to be read off the drive in parallel, providing improved I/O bandwidth. The larger the number of PDs in the RAID system, the higher the bandwidth of the system, but also the greater the risk of data loss. Parity is not used in RAID level 0 systems, which means that RAID level 0 systems do not have any fault tolerance. Consequently, when any PD fails, the entire system fails.

In RAID level 1 systems, mirroring without parity is used. Mirroring corresponds to the replication of stored data onto separate PDs in real time to ensure that the data is continuously available. RAID level 1 systems provide fault tolerance from disk errors because all but one of the PDs can fail without causing the system to fail. RAID level 1 systems have increased read performance when used with multi-threaded operating systems, but also have a small reduction in write performance.

In RAID level 2 systems, redundancy is used and PDs are synchronized and striped in very small stripes, often in single bytes/words. Redundancy is achieved through the use of Hamming codes, which are calculated across bits on PDs and stored on multiple parity disks. If a PD fails, the parity bits can be used to reconstruct the data. Therefore, RAID level 2 systems provide fault tolerance. In essence, failure of a single PD does not result in failure of the system.

RAID level 3 systems use byte-level striping in combination with interleaved parity bits and a dedicated parity disk. RAID level 3 systems require the use of at least three PDs. The use of byte-level striping and redundancy results in improved performance and provides the system with fault tolerance. However, use of the dedicated parity disk creates a bottleneck for writing data due to the fact that every write requires updating of the parity data. A RAID level 3 system can continue to operate without parity and no performance penalty is suffered in the event that the parity disk fails.

RAID level 4 is essentially identical to RAID level 3 except that RAID level 4 systems employ block-level striping instead of byte-level or word-level striping. Because each stripe is relatively large, a single file can be stored in a block. Each PD operates independently and many different I/O requests can be handled in parallel. Error detection is achieved by using block-level parity bit interleaving. The interleaved parity bits are stored in a separate single parity disk.

RAID level 5 uses striping in combination with distributed parity. In order to implement distributed parity, all but one of the PDs must be present for the system to operate. Failure of any one of the PDs necessitates replacement of the PD. However, failure of a single one of the PDs does not cause the system to fail. Upon failure of one of the PDs, any subsequent reads can be calculated from the distributed parity such that the PD failure is masked from the end user. If a second one of the PDs fails, the system will suffer a loss of data, and the system is vulnerable until the data that was on the failed PD is reconstructed on a replacement PD.

RAID level 6 uses striping in combination with dual distributed parity. RAID level 6 systems require the use of at least four PDs, with two of the PDs being used for storing the distributed parity bits. The system can continue to operate even if two PDs fail. Dual parity becomes increasingly important in systems in which each VD is made up of a large number of PDs. RAID level systems that use single parity are vulnerable to data loss until the failed drive is rebuilt. In RAID level 6 systems, the use of dual parity allows a VD having a failed PD to be rebuilt without risking loss of data in the event that a PD of one of the other VDs fails before completion of the rebuild of the first failed PD.

Many variations on the seven basic RAID levels described above exist. For example, the attributes of RAID levels 0 and 1 may be combined to obtain a RAID level known as RAID level 0+1. When designing a RAID system, the RAID level that the system will have is selected at the time the design is created based on the needs of the user (i.e., cost, capacity, performance, and safety against loss of data). Over time, however, it is possible that the RAID system will cease to meet the user's needs. Often times, the user will replace the RAID system having the current RAID level with a new RAID system having a different RAID level. In order to replace the current RAID system, the data stored in the current RAID system is backed up to a temporary backup storage system. The VD parameters are also stored in a backup storage system. Once the data and VD parameters have been backed up, the new RAID system is put in place and made operational. The backed up data is then moved from the backup storage system to the new RAID system. The stored VD parameters are used to create a mapping between the VDs of the new RAID system and the PDs of the new RAID level system.

Recently, a technique known as RAID level migration has been used to migrate a RAID system from one RAID level to another RAID level. Using RAID level migration eliminates the need to replace the current RAID level system with a new RAID level system. With RAID level migration, it is not necessary to move the data to a backup storage system. Rather, during the migration process, the data is read from the PDs comprising the current VDs and written to the PDs comprising the new VDs. Migration is generally superior to replacement in terms of costs and time.

FIG. 1 illustrates a block diagram of a typical RAID system 2 having the capability of performing RAID level migration. The system 2 includes a hardware controller 3 for performing the RAID level migration. The hardware controller 3 includes a central processing unit (CPU) 4, a memory device 5, a nonvolatile random access memory device (NVRAM) 6, and an I/O interface device 7. The I/O interface device 7 is configured to perform data transfer in compliance with known data transfer protocol standards, such as the Serial Attached SCSI (SAS) and/or the Serial Advanced Technology Attachment (SATA) standards. The I/O interface device 7 controls the transfer of data to and from multiple PDs 8.

The controller 3 communicates via a peripheral interconnect (PCI) bus 9 with a server CPU 11 and a memory device 12. The memory device 12 stores software programs for execution by the server CPU 11 and data. During a typical write action, the server CPU 11 sends instructions for a write request via the PCI bus 9 to the hardware controller 3. The CPU 4 of the hardware controller 3 causes the data to be temporarily stored in a memory device 5 of the hardware controller 3. The data is subsequently transferred from the memory device 5 via the I/O interface device 7 to one or more of the PDs 8. The memory device 5 contains the core logic for performing the mapping between virtual addresses of the VD and physical addresses of the PDs 8. The CPU 4 performs calculations in accordance with the RAID level of the system 2, such as parity calculations. In the event that the current RAID level of the system 2 uses parity, the I/O interface device 7 causes the parity bits to be stored in one or more of the PDs 8.

During a typical read operation, the server CPU 11 sends a corresponding request to the hardware controller 3 via the PCI bus 9. The CPU 4, with use of the logic held in memory device 5, processes the request and causes the requested data to be retrieved from the PDs 8. The retrieved data is temporarily stored in the memory device 5. Subsequently, the data is read out of the memory device 5 and transferred over the PCI bus 9 to the server CPU 11 to satisfy the read request.

In order to perform the migration process, the CPU 4 of the hardware controller 3 reconfigures the core logic of the VDs in memory device 5 to cause it to operate in accordance with the new RAID level and to perform the new VD to PD mapping. During the migration process, the migration parameters are saved in the NVRAM 6. The migration parameters typically include:

(1) Migration Type: information that describes the type of migration that is being performed (e.g., R0 to R1, R1 to R5, etc.) and which PDs are involved;
(2) Migration Progress: information that describes which block of data is currently being migrated and the corresponding read and write pointers;
(3) Migration Status: information that describes which stage of operations has recently been completed; and
(4) Media errors: information that describes media errors that have been temporarily recorded during the migration of the current block of data.

The purpose of storing the migration parameters in NVRAM 6 during the migration process is to eliminate the risk of data being lost during the migration process in the event of a loss of power or other unexpected errors. However, the need for a hardware controller having NVRAM increases the overall costs associated with the system 2 and increases the costs associated with performing RAID level migration.

SUMMARY OF THE INVENTION

The invention provides a RAID system having an ability to be migrated from a first RAID level to a second RAID level, and a method for performing the migration. The first and second RAID levels may be any arbitrary RAID levels. The system comprises a server CPU, a server memory device, a communications bus, an I/O interface device, and at least first and second PDs connected to the I/O interface device. The server CPU comprises processing logic that is configurable to execute a migration computer software program to migrate the system from the first RAID level to the second RAID level. The server memory device comprises memory locations located at memory addresses that are configurable to have electronic information written thereto and read therefrom. At least a portion of the memory addresses of the server memory device are allocated for use as a migration buffer. The server CPU, the server memory device and the I/O interface device are connected to the bus.

Each PD has a data storage region for storing data and a data disk format (DDF) storage region for storing configuration information relating to the PD. The data storage region of each PD comprises a plurality of data storage addresses. The DDF storage region of each PD comprises one or more DDF storage addresses. The I/O interface device is configured to write to and read from the addresses of each of the PDs. When the server CPU executes the migration computer software program, the server CPU configures the I/O interface device to migrate from a first virtual disk drive ($VD_0$) comprising at least one of the first and second PDs to a second virtual disk drive device ($VD_1$) comprising at least one of the first and second PDs. $VD_0$ corresponds to the first RAID level and $VD_1$ corresponds to the second RAID level.

The method comprises the following. In a server CPU of a RAID system, a migration computer software program is executed to cause the RAID system to perform tasks associated with migrating the system from a first RAID level to a second RAID level. In a server memory device of the system, at least a portion of the memory addresses are allocated for use as a migration buffer. One or more commands are sent over a communications bus of the RAID system from the server CPU to an I/O interface device of the RAID system. In the I/O interface device, the commands are received and executed to migrate from a first virtual disk drive ($VD_0$) to a second virtual disk drive ($VD_1$). $VD_0$ comprises at least one of a first PD and a second PD. $VD_1$ comprises at least one of the first and second PDs. $VD_0$ corresponds to the first RAID level and $VD_1$ corresponds to the second RAID level, which are different from one another.

These and other features and advantages of the invention will become apparent from the following description, drawings and claims.

DETAILED DESCRIPTION OF ILLUSTRATIVE EMBODIMENTS

In accordance with the invention, a RAID level migration system and method are provided that enable RAID level migration to be performed without the need for a hardware controller having NVRAM for storing the migration parameters. Eliminating the need for a hardware controller having NVRAM significantly reduces the costs associated with performing RAID level migration.

Figure 1:
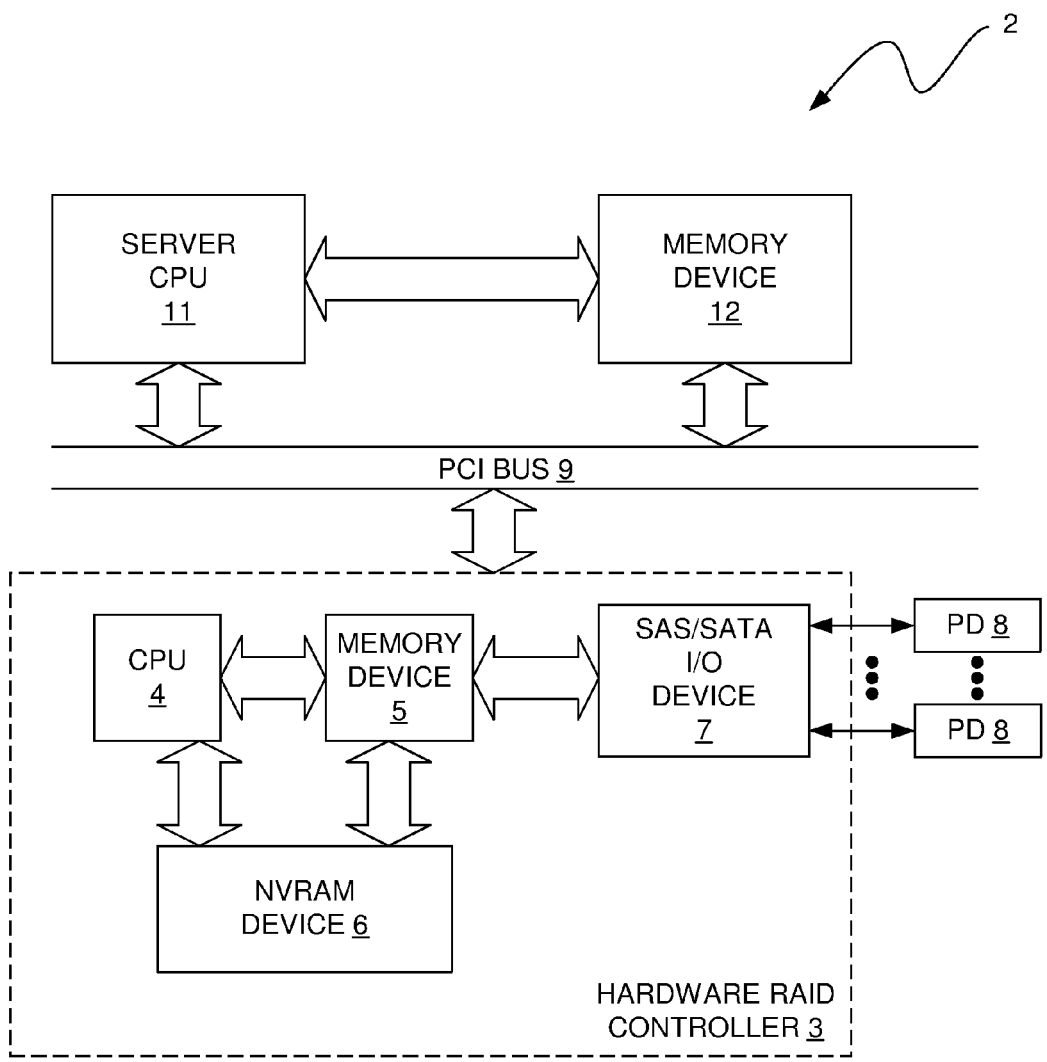
FIG. 1 illustrates a block diagram of a typical RAID system having the capability of performing RAID level migration.
Figure 2:
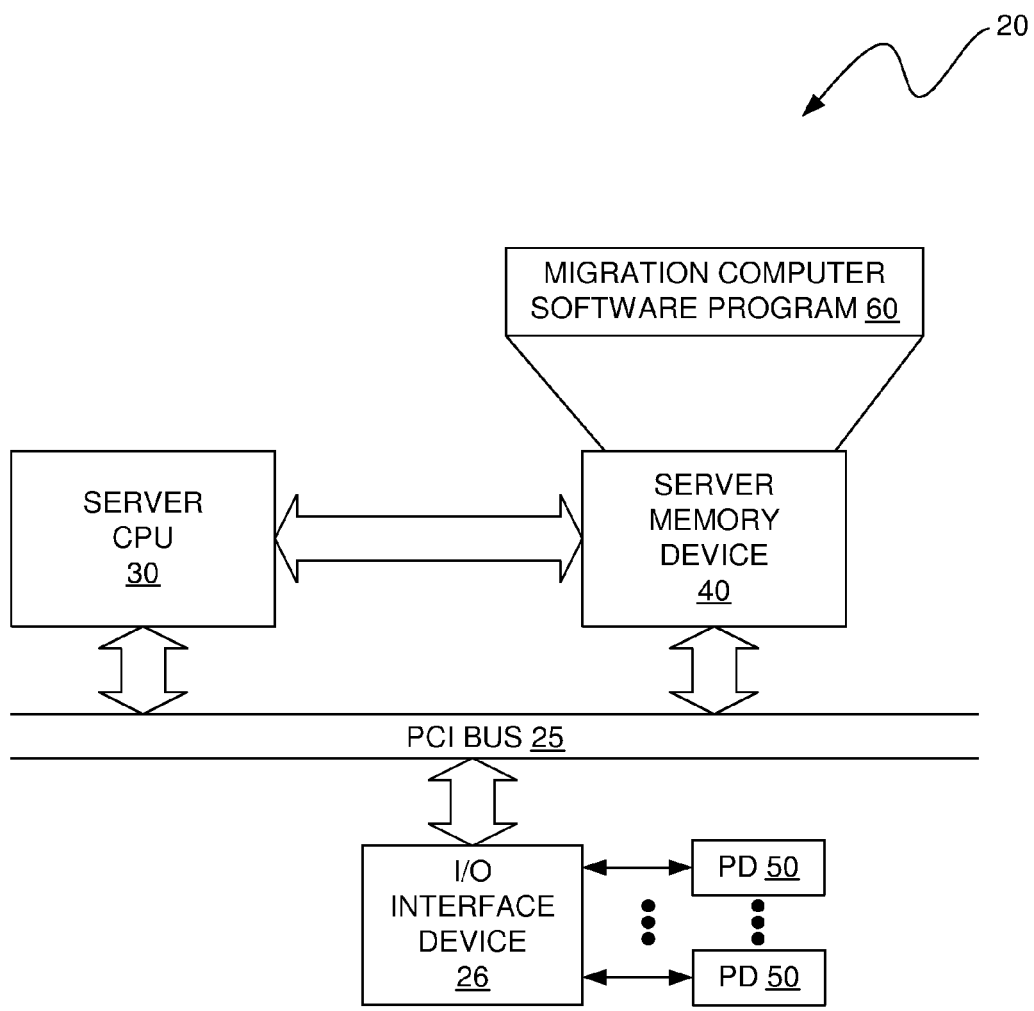
FIG. 2 illustrates a block diagram of the RAID system in accordance with an embodiment of the invention for performing RAID level migration.

FIG. 2 illustrates a block diagram of the RAID system 20 in accordance with an embodiment of the invention for performing RAID level migration. The system 20 is capable of migrating from any arbitrary RAID level to any other arbitrary RAID level. Importantly, the hardware controller 3 shown in FIG. 1 has been eliminated from the RAID system 20 shown in FIG. 2. Consequently, the costs associated with implementing the hardware controller 3 are eliminated.

The system 20 includes a server CPU 30, a server memory device 40, a PCI bus 25, an I/O interface device 26, and one or more PDs 50. The number of PDs 50 used in the system varies depending on the chosen RAID level. The number of PDs 50 used in the system 20 is equal to M, where M is any positive integer that is equal to or greater than one. As is common in RAID systems, the PDs 50 are non-volatile storage devices. The I/O interface device 26 is typically a SAS/SATA device that is similar or identical to the SAS/SATA I/O interface device 6 shown in FIG. 1. The I/O interface device 26 controls the storing of data in the PDs 50 and the retrieval of data from the PDs 50.

The server memory device 40 has a computer software program 60 stored therein that is executed by the server CPU 30 to perform RAID level migration. When the migration software program 60 is executed by the server CPU 30, the program causes an interface to be displayed to a user (not shown) on a display device (not shown) that allows the user to enter information into the system 20 to specify a type of RAID level migration to be performed (e.g., migration from a RAID level 1 system to a RAID level 5 system). When the server CPU 30 processes this information in accordance with the migration software program 60, the CPU 30 causes the I/O interface device 26 to be configured to map virtual addresses in the current VD to virtual addresses in the new VD and to map the virtual addresses in the new VD to the physical addresses in the PDs that make up the new VD. The term "current VD" will be referred to interchangeably herein as "$VD_0$". The term "new VD" will be referred to interchangeably herein as "$VD_1$".

In order to enable RAID level migration to be performed in software as opposed to being performed by a hardware controller in the manner described above with reference to FIG. 1, it was necessary to determine a way in which the migration parameters could be securely stored during migration without the need to use a separate NVRAM device for this purpose. The manner in which this is accomplished in accordance with illustrative embodiments of the invention will now be described with reference to FIGS. 3-7B. As indicated above, the migration parameters typically include:

(1) Migration Type: information that describes the type of migration that is being performed (e.g., R0 to R1, R1 to R5, etc.), identifies the PDs that are involved in the migration, and indicates the VDs to which the PDs belong currently as well as the VDs to which the PDs will belong after migration;

(2) Migration Progress: information that describes which the block of data that is currently being migrated and the corresponding read and write pointers;

(3) Migration Status: information that describes which stage of operations has recently been completed; and 4) Media errors: information that describes media errors that have been temporarily recorded during the migration of the current block of data.

Figure 3:
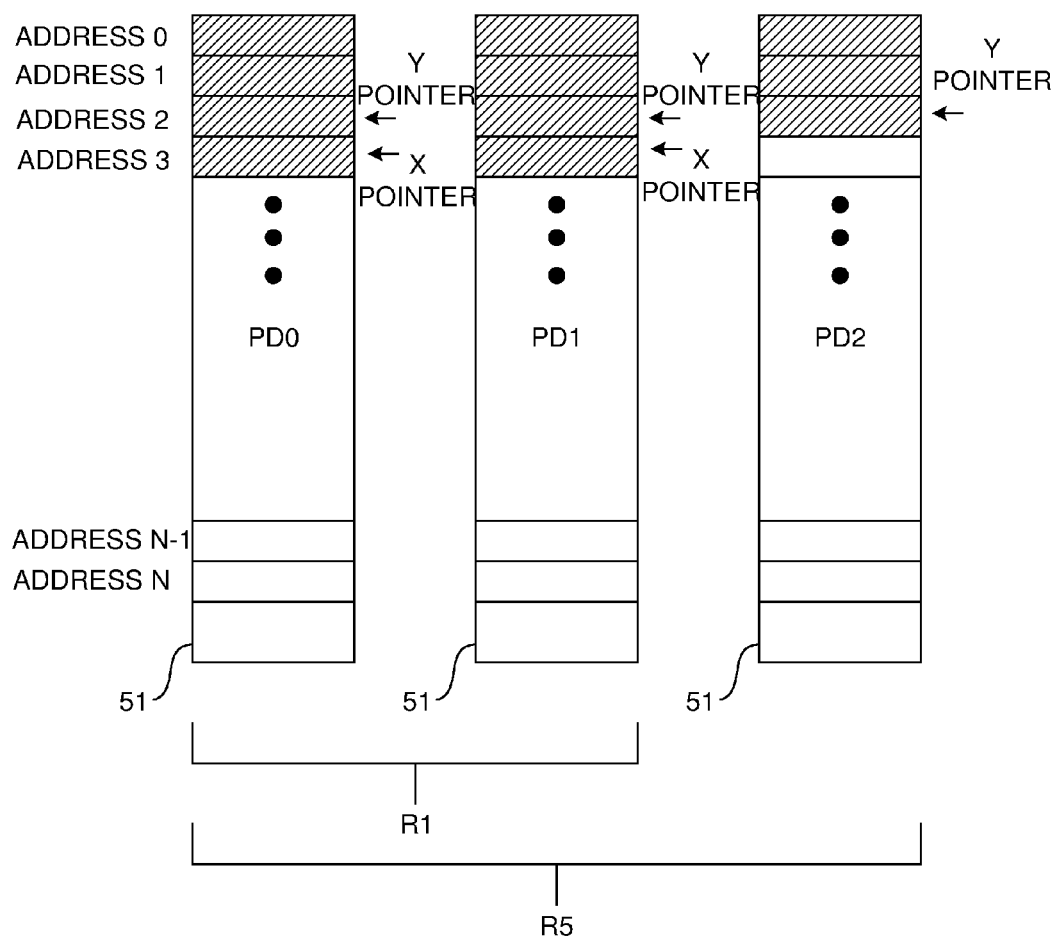
FIG. 3 illustrates a block diagram of the PDs of the system shown in FIG. 2 in accordance with an illustrative, or exemplary, embodiment.

FIG. 3 illustrates a block diagram of the PDs 50 of the system 20 shown in FIG. 2 in accordance with an illustrative, or exemplary, embodiment. The example represented by FIG. 3 assumes that prior to migration being performed, the system 20 shown in FIG. 2 is a RAID level 1 system having a current VD that comprises two PDs, namely, PD0 and PD1. This example also assumes that after migration has been performed, the system 20 shown in FIG. 2 is a RAID level 5 system having a new VD that comprises three PDs, namely, PD0, PD1 and PD2. Therefore, in accordance with this example, the current RAID system is being migrated to a new RAID system having increased storage capacity. The RAID level 1 VD and the RAID level 5 VD are referred to herein as the R1 VD and the R5 VD, respectively.

PD0, PD1 and PD2 each have data storage addresses 0-N, where N is a positive integer that is greater than 0. As is common in PDs used in RAID systems, a reserved storage region 51 exists in each of the PDs that is located below data storage address N. The storage region 51 is normally used for storing data disk format (DDF) information, which is configuration information that describes the logical configuration of the PD. Assuming that PD0, PD1 and PD2 have equal amounts of storage space, and assuming that when the data from the R1 VD is migrated to the R5 VD the data is distributed (i.e., striped) evenly across PD0, PD1 and PD2, then at least some amount of unused data storage space will exist in PD2 during the migration process. The term "unused data storage space", as that term is used herein, is intended to denote addresses that are not within the DDF storage regions 51 and that are not currently being written with data that is being migrated during the migration process. This makes it possible to allocate some of the unused data storage space in PD2 for storage of the migration parameters associated with PD2 during migration, which eliminates the need to use an additional NVRAM device for this purpose. The migration parameters associated with PD0 and PD1 are stored in their respective DDF storage regions 51. However, during the migration process, the DDF storage region 51 of PD2 has not yet been configured. For this reason, the migration parameters associated with PD2 are stored in unused data storage space of PD2. Preferably, a backup copy of the migration parameters associated with PD2 is stored in the DDF storage regions 51 of PD0 and/or of PD1.

Prior to performing migration, a determination is made as to the direction in which the migration will be performed in the PDs. In other words, a determination is made as to whether migration is to start at the beginning of the PDs (address 0) and progress toward the end of the PDs (address N), or vice versa. This determination is made based on whether the new VD, $VD_1$, will have a larger number of PDs than the current VD, $VD_0$. If $VD_0$ is smaller than $VD_1$ in terms of the number of PDs splitting the data, then the migration process starts at address 0 in the PD(s) of $VD_0$. If $VD_0$ is larger than $VD_1$ in terms of the number of PDs splitting the data, then the migration process starts at address N in the PD(s) of $VD_0$. Selecting the direction of migration in this manner eliminates the risk that an address of a PD that is in both $VD_0$ and $VD_1$ will be written before it has been read.

The addresses that data is read from during the migration process are referred to herein as the X addresses, which are addressed by an X pointer. These addresses correspond to addresses in the current VD, $VD_0$. The addresses that data is written to during the migration process are referred to herein as the Y addresses, which are addressed by a Y pointer. These addresses correspond to addresses in the new VD, $VD_1$. The X and Y pointer values are part of the migration parameters referred to above as "(2) Migration Progress", which is saved in an unused data portion of PD2.

As described above, in the example depicted in FIG. 3, migration will start at the beginning of the PDs, i.e., at address 0, and will progress in a direction toward the end of the PDs, i.e., toward address N. Therefore, the X and Y pointer values are initially set to 0. In this situation, data may be written to an address in $VD_1$ immediately after it is read from an address in $VD_0$. For example, data is read from address 0 in PD0 and PD1 and written to address 0 in PD0, PD1 and PD2. The X pointer value is incremented after the data has been read. Likewise, the Y pointer value is incremented after the data has been written. Next, the data at address 1 in PD0 and PD1 is read and written to address 1 in PD0, PD1 and PD2. The X and Y pointer values are again incremented and the data is read from the corresponding X address in PD0 and PD1 and is written to the corresponding Y address in PD0, PDP1 and PD2. This read/write process iterates until the migration process is complete. In the example, shown depicted in FIG. 3, in the current iteration, data has been read from addresses 0-3 in PD0 and PD1 and has been written to addresses 0-2 in PD0, PD1 and PD2.

It can be seen in FIG. 3, that although the X and Y pointer values are both initially set to 0, the X pointer value increases faster than the Y pointer value due to there being a larger number of PDs in $VD_1$ than there are in $PD_0$. Another way to conceptualize this is that the read speed on $VD_0$ is greater than the write speed on $VD_1$. It should be noted that although the example described above with reference to FIG. 3 refers to data being read from a single address in each of PDs 0 and 1 and being written to a single address in each of PDs 0, 1 and 2, each data read and data write task preferably deals with a large and contiguous chunk of data sectors. For example, a single read task may result in 1 megabyte (1M) of data being read from each of PD0 and PD1. The subsequent write task may result in 512 kilobytes (512K) of data being written to each of PD0 and PD1 and 512K of parity being written to PD2. This reduces PD seek times and improves overall performance. After a chunk of data has been read from VD0 and before it is written to VD1, the chunk of data preferably is stored in a migration buffer. The migration buffer that is used for this purpose is preferably, but not necessarily, a block of contiguous addresses in the system memory device 40 shown in FIG. 2. During performance of a write task, subsequent to the data being stored in the migration buffer, the data is read out of the migration buffer and written to the corresponding Y addresses of the PDs that make up $VD_1$. If the I/O interface device 26 shown in FIG. 2 cannot handle this large chunk of data all at once, the read and write tasks will be split into multiple read and write tasks.

During the migration process, if additional precautions are not taken, it may be possible for both a read and a write to happen on the same address of the same PD if the PD is part of both the $VD_0$ and $VD_1$. For this reason, a flag is used to indicate AFTER_WRITE and AFTER_READ migration progress during the migration process, which is one of the aforementioned migration parameters. If the flag is asserted, the asserted value indicates AFTER_WRITE status. If the flag is deasserted, the deasserted value indicates AFTER_READ status. While the flag is asserted (AFTER_WRITE status), this is an indication that (1) data is being read from $VD_0$, (2) data that has been read is being stored in the migration buffer, or (3) data that has been read is being dumped to some other backup storage device. $VD_0$ may only be read if the system detects that the flag is asserted. While the flag is deasserted (AFTER_READ status), this is an indication that data is currently being written to $VD_1$. The system may only write data to $VD_1$ if it detects that the flag is deasserted. Use of the flag ensures that a data sector on a given PD will not be written before it has been read, thereby preventing data from being corrupted. The I/O interface device 26 comprises logic that is configured by the server CPU 30 to control the process of setting and detecting the value of the flag, reading data from $VD_0$ and writing to $VD_1$. The logic of the I/O interface device 26 is also configured by the server CPU 30 to store the primary and backup copies of the migration parameters in the PDs and to retrieve the migration parameters from the PDs.

Figure 4:
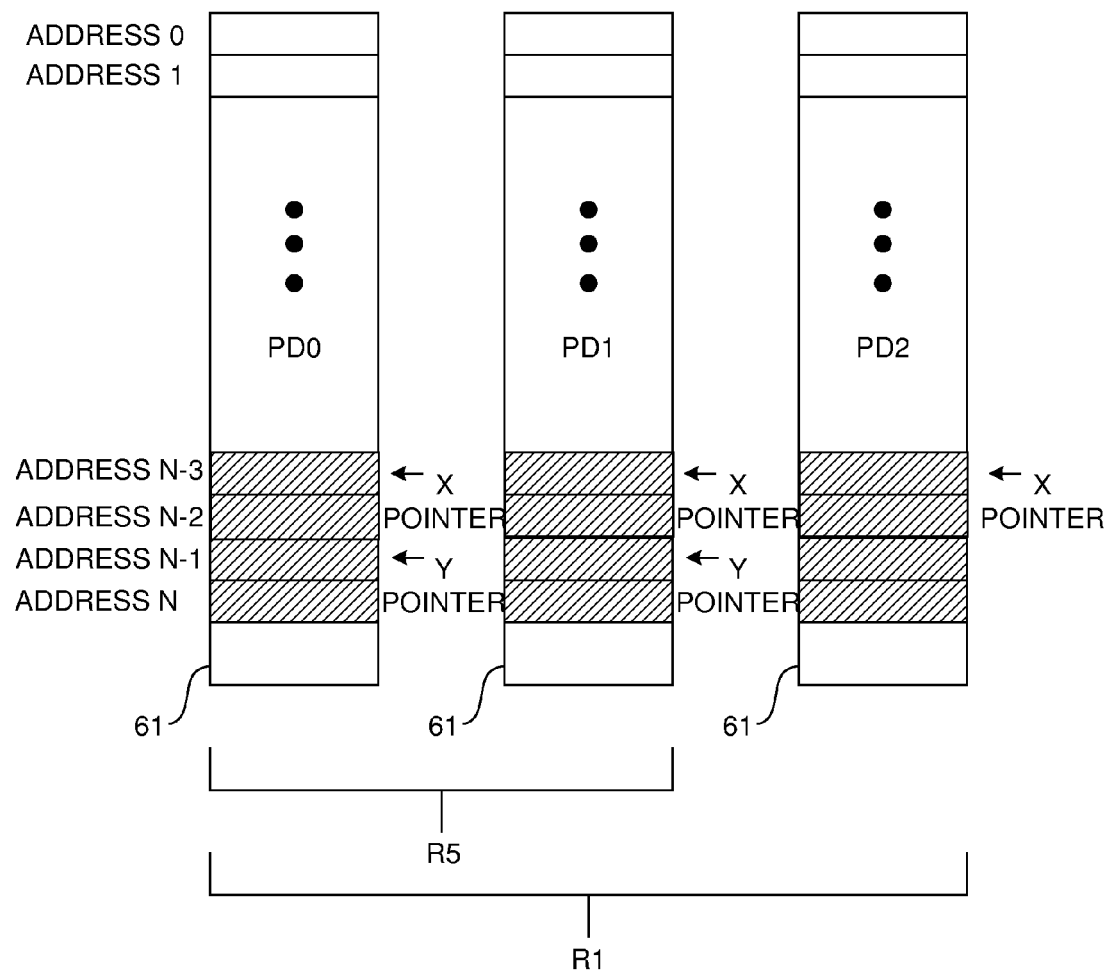
FIG. 4 illustrates a block diagram of the PDs of the system shown in FIG. 2 in accordance with another illustrative embodiment.

FIG. 4 illustrates a block diagram of the PDs 50 of the system 20 shown in FIG. 2 in accordance with another illustrative embodiment. In accordance with this embodiment, the system is being migrated from an R5 VD to an R1 VD. Thus, the number of PDs in the new VD, $VD_1$, is less than the number of PDs in the current VD, $VD_0$. This type of migration typically only happens in situations where more PDs than are necessary have been implemented in $VD_1$. The migration will start at the end of the PDs, i.e., at address N and will progress in a direction toward the beginning of the PDs, i.e., address 0. Therefore, the X and Y pointer values are initially set to N. However, because there are more PDs in $VD_0$ than there are in $VD_1$, the speed at which data is written to $VD_1$ should be less than the speed at which data is read from $VD_0$. Otherwise, data could be corrupted. Therefore, the Y pointer value is decremented less often than the X pointer value. For example, if data is read from addresses N through N-3 in PD0, PD1 and PD2 during a particular time period, the X pointer value is decremented three times during that time period. During that same time period, data may have only been written to addresses N through N-1 in PD0 and PD1, in which case the Y pointer value was decremented only once. This ensures that data stored in $VD_0$ is not corrupted before it can be read. Other mechanisms may be used to ensure that addresses are not written before they have been read. The invention is not limited to any particular mechanism or technique for accomplishing this delay between reading and writing data. Any mechanism or technique that enables the writing of addresses to be delayed until they have been read is suitable for use with the invention.

The risk of addresses being written before they have been read is relatively small in cases where $VD_0$ and $VD_1$ do not have the same number of PDs because there typically will not be any overlap in addresses that are used by $VD_0$ and $VD_1$ for a given read/write command. However, if some overlap exists, and a power failure occurs during the process of data being moved from the migration buffer into $VD_1$, then it is possible that some of the data in the overlapping addresses will be corrupted. To ensure that any data that may have been corrupted is restored, the data that in the overlapped region should be backed up to a backup storage area. After power is returned, the backed up data is written to the corresponding addresses in $VD_1$. The manner in which this is accomplished will now be described with reference to FIG. 5.

Figure 5:
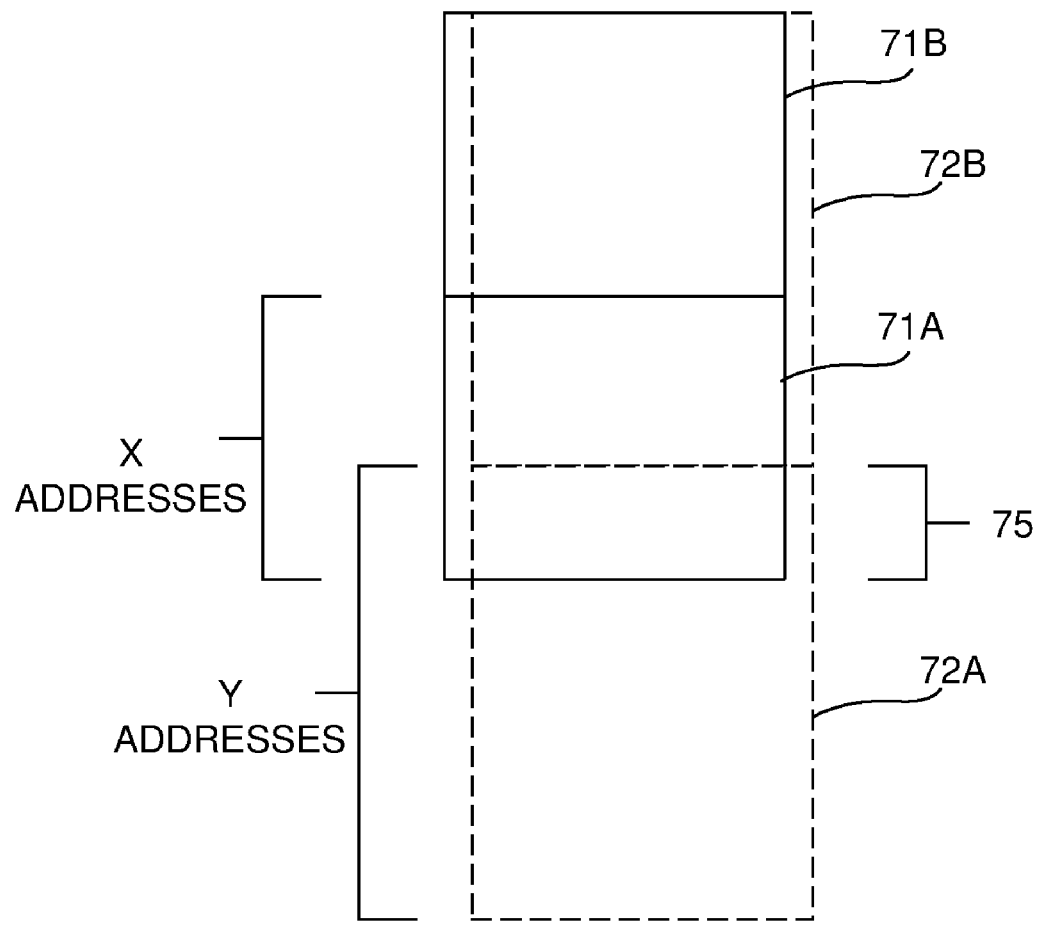
FIG. 5 is a pictorial diagram that demonstrates the overlap between a block of data read from contiguous X addresses of $VD_0$ during a read cycle and a block of data written to contiguous Y addresses of $VD_1$ during a write cycle.

FIG. 5 is a pictorial diagram that demonstrates the overlap between a block of data 71A read from contiguous X addresses of $VD_0$ during a read cycle and a block of data 72A written to contiguous Y addresses of $VD_1$ during a write cycle. In this example, $VD_0$ comprises a larger number of PDs than $VD_1$. Block 71B represents a block of data that was read from contiguous X addresses of $VD_0$ in an immediately succeeding read cycle, i.e., after block 72A was read. Block 72B represents a block of data that was written to contiguous Y addresses of $VD_1$ during an immediately succeeding write cycle, i.e., after block 72A was written. The X and Y addresses in the region indicated by numeral 75 are the same addresses, and therefore correspond to the aforementioned overlapping addresses.

When the data block 71A is read and stored in the migration buffer, the portion of the data block 71A that corresponds to the overlapping addresses 75 is copied to a backup storage area, which may be one of the PDs 50 shown in FIG. 2. The backup storage space may be, for example, (1) a storage region in a spare PD that is used for this purpose, (2) unused storage space in a PD that is used by one, but not both of $VD_0$ and $VD_1$, or (3) unused storage space in a PD that is used by both of $VD_0$ and $VD_1$. In order of preference, (1) would be preferred over (2), and (2) would be preferred over (3).

If a power failure occurs at an instant in time when data is being moved from the migration buffer into $VD_1$, then after the power has returned, the server CPU 30 retrieves the backed up data and writes to the corresponding addresses in $VD_1$. The migration parameters associated with the PD in $VD_1$ to which the data was being written when the power failure occurred are retrieved from the PD. These parameters include information that is used to restore the value of the Y pointer in the PD to the address in the PD where the first piece of data from the backed up portion of the migration buffer was stored. Because the size of the backed up portion of the migration buffer is known, then the Y pointer value corresponding to the end address in the PD where the last piece of the backed up data will be stored can be easily computer. Using these start and end Y addresses, the backed up data is read from the back up storage space and written to the corresponding addresses in $VD_1$. The migration process then resumes and continues to iterate until it is completed.

Figure 6:
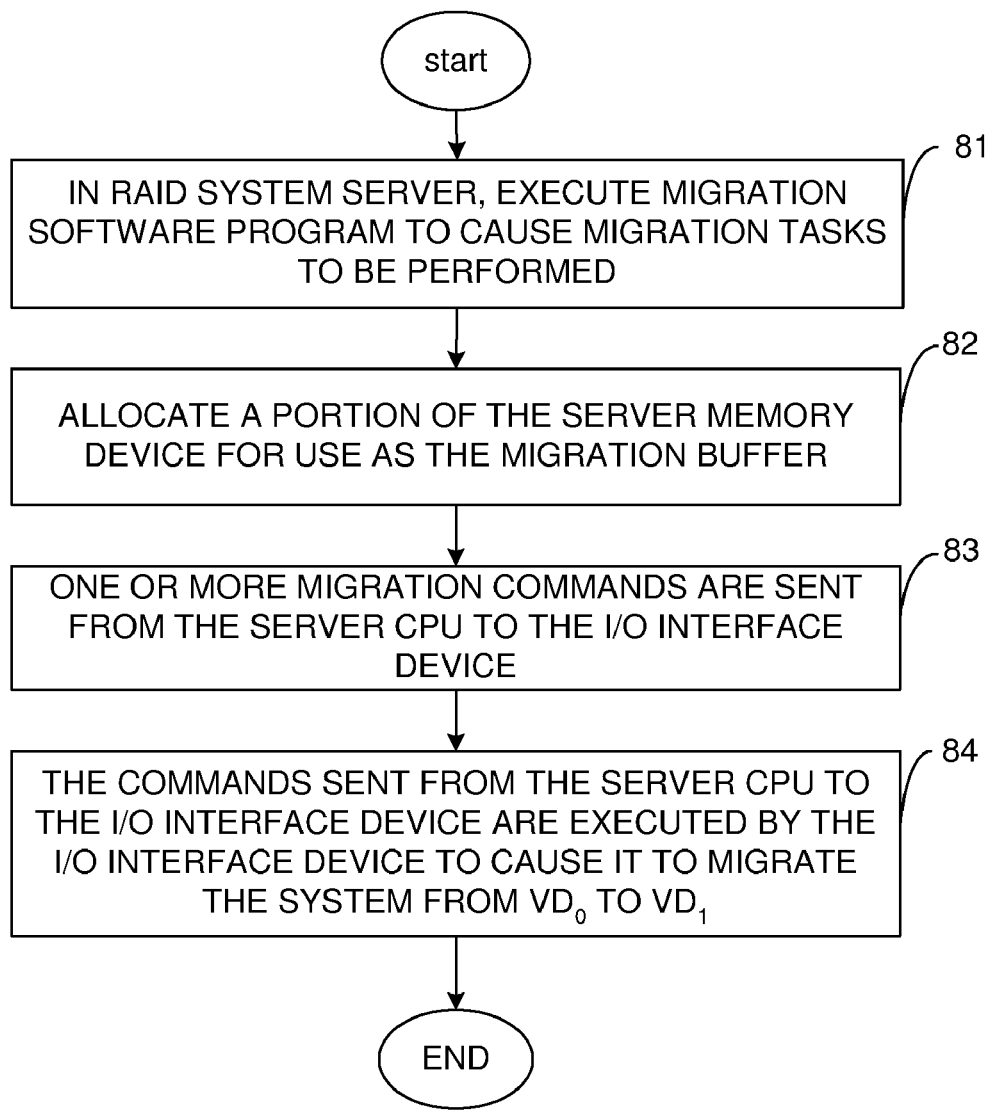
FIG. 6 illustrates a flowchart that represents the method for performing RAID level migration in accordance with an illustrative embodiment

FIG. 6 illustrates a flowchart that represents the method of the invention in accordance with an illustrative embodiment for performing RAID level migration. In a server CPU of the RAID system, a migration computer software program is executed to cause the RAID system to perform tasks associated with migrating the system from a first RAID level to a second RAID level, as indicated by block 81. In a server memory device of the system, a portion of the storage space contained in the server memory device is allocated for use as a migration buffer, as indicated by block 82. One or more commands are sent over a communications bus of the system from the server CPU to an I/O interface device of the RAID system, as indicated by block 83. The server CPU, the server memory device and the I/O interface device are all connected to the bus. In the I/O interface device, the commands sent over the bus from the server CPU are received and executed to migrate from a first virtual disk drive, $VD_0$, comprising at least one of a first and a second PD to a second virtual disk drive, $VD_1$, comprising at least one of the first and second PDs, as indicated by block 84. $VD_0$ corresponds to the first RAID level and $VD_1$ corresponds to the second RAID level, which are different from one another.

Figure 7A:
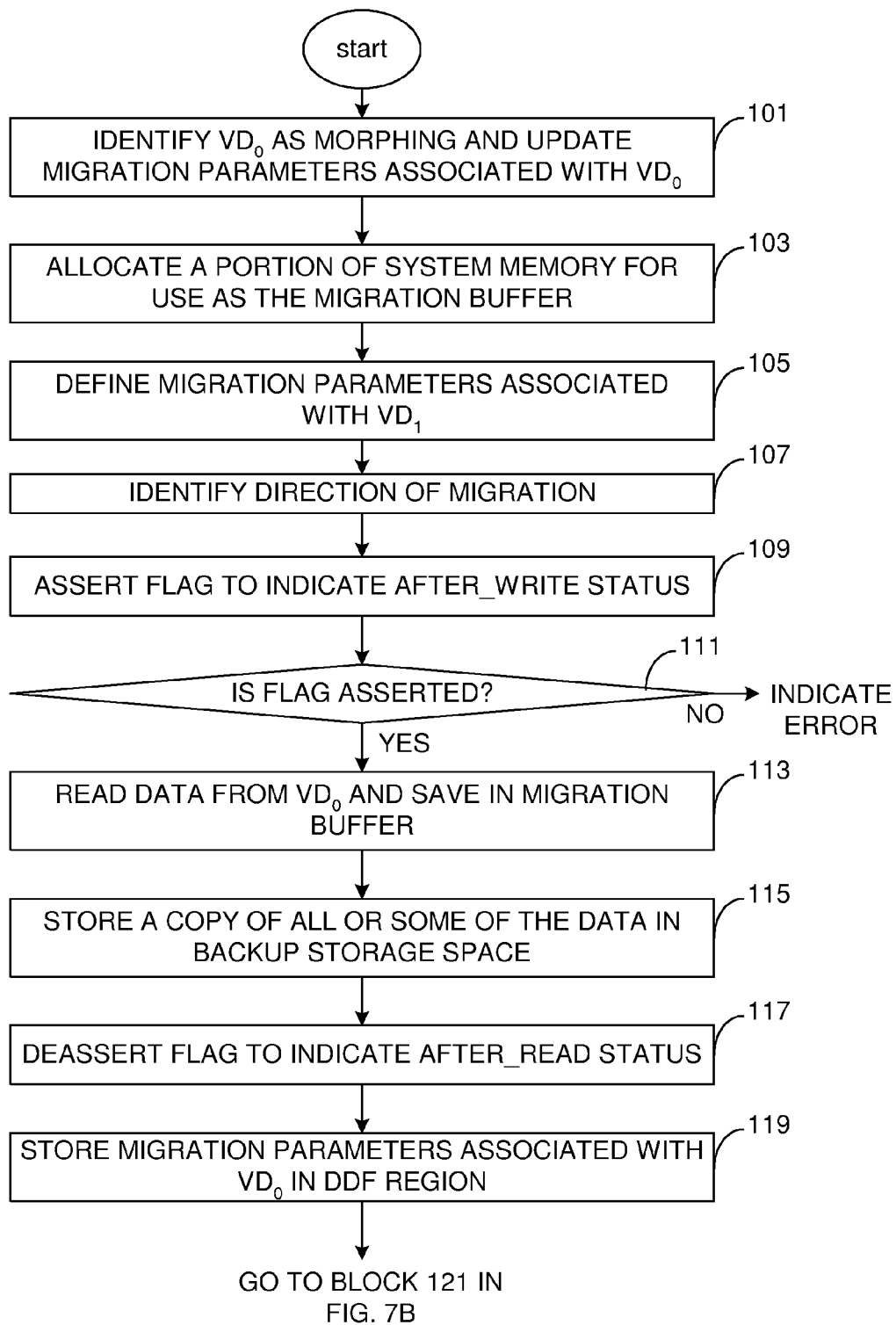
FIGS. 7A and 7B illustrate a flowchart that represents a more detailed example of an illustrative embodiment for performing RAID level migration.
Figure 7B:
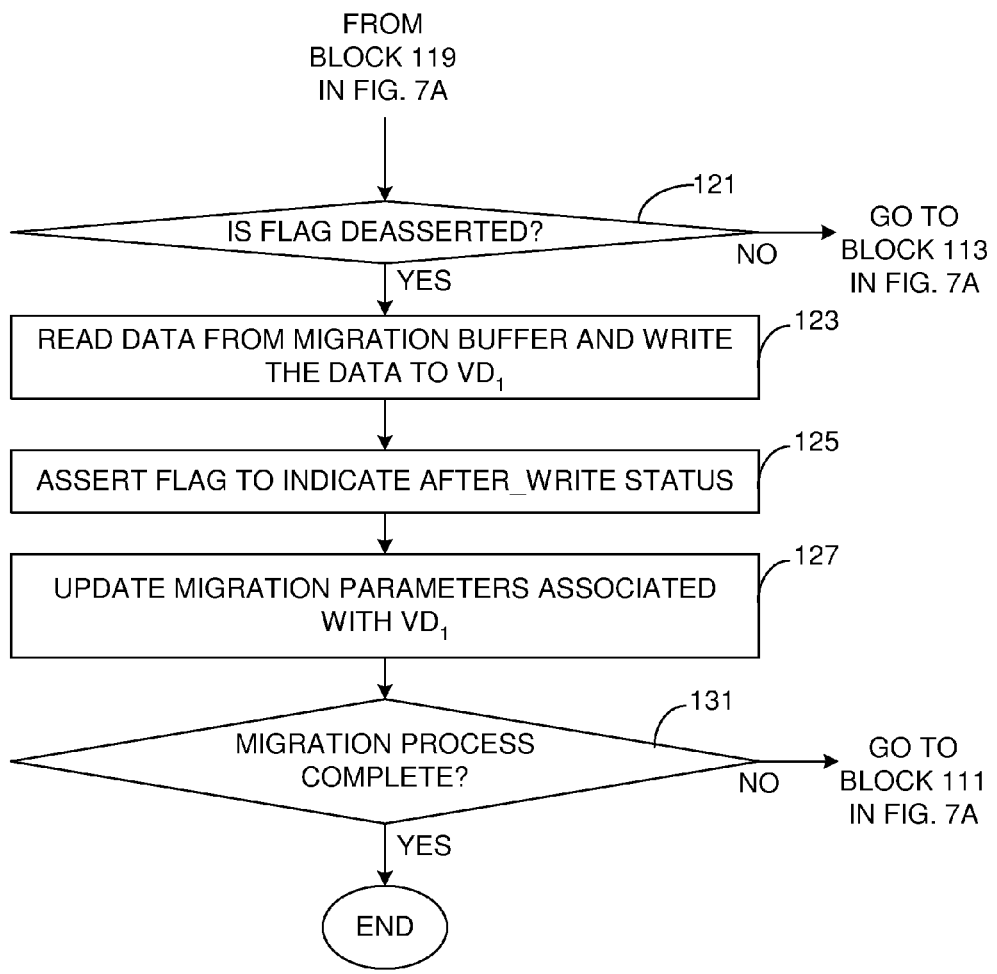

A more detailed exemplary embodiment of the method of the invention for performing RAID level migration will now be described with reference to FIGS. 7A and 7B, which together illustrate a flowchart that represents the method. As indicated above with reference to FIG. 2, the migration algorithm is performed as a computer software program in a way that obviates the need for a RAID hardware controller having NVRAM for storing migration parameters. However, it will be understood by persons of ordinary skilled in the art, in view of the description provided herein, that some aspects of the invention may be performed partially in hardware as a needed, or in a combination of hardware and firmware or software.

At the beginning of the algorithm, VD0 is identified as "morphing" and the migration parameters stored in DDF region(s) of the associated PD(s) are updated to indicate that $VD_0$ morphing, as indicated by block 101. The term "morphing", as that term is used herein, is intended to denote that $VD_0$ is being migrated to $VD_1$. A contiguous block of memory addresses in server memory device 40 is allocated for use as the aforementioned migration buffer, as indicated by block 103. Typically, this block of addresses will be chosen to be as large as possible. The migration parameters associated with a target VD, i.e., $VD_1$, are then set to values that describe $VD_1$, as indicated by block 105. The direction of the migration, i.e., from the starting address of the PD in a direction toward the ending address of the PD, or vice versa, as indicated by block 107. Prior to the first iteration of the migration process being performed, the aforementioned flag is asserted to indicate AFTER_WRITE status, as indicated by block 109.

A determination is then made at block 111 as to whether or not the flag is asserted. If the flag is not asserted at this point, then an error has occurred, and an error indication is provided to the user. If the flag is asserted, an amount of data equal in size to the amount of data that can be stored in the migration buffer is read from $VD_0$ and stored in the migration buffer, as indicated by block 113. As described above, preferably some or all of the data stored in the migration buffer is copied to the backup storage space in case of power failure, as indicated by block 115. The flag is then deasserted, as indicated by block 117, to indicate AFTER_READ status. The migration progress migration parameters, which include the X address pointer value and the flags, are saved in the DDF of $VD_0$, as indicated by block 119.

A determination is then made at block 121 as to whether or not the flag is deasserted. If so, the data stored in the migration buffer is written to $VD_1$, as indicated by block 123. The flag is then asserted, as indicated by block 125. The migration parameters are updated, as indicated by block 127. As indicated above, the migration parameters associated with $VD_0$ are stored and updated in the DDF regions of the PDs of $VD_0$. If $VD_1$ has a larger number of PDs than $VD_0$, then the migration parameters associated with $VD_1$ are stored and updated in the unused storage space of $VD_1$. If $VD_1$ has fewer PDs than $VD_0$, then the migration parameters associated with $VD_1$ are stored and updated in the DDF regions of the PDs of $VD_0$. The updated migration parameters include, for example, the current X address pointer value, the current Y pointer value, the flag value, and a migration progress indicator that indicates whether or not migration is complete. A determination is then made as to whether or not the migration process is complete, as indicated by block 129. If not, the algorithm returns to block 111. If so, the $VD_0$ and $VD_1$ parameters and replace $VD_0$ with $VD_1$, as indicated by block 131.

With reference again to FIG. 2, during the migration process, the migration commands that are sent from the CPU server 30 via bus 25 to the I/O interface device 26 preferably are three different types of commands, namely: (1) one command type that identifies data sectors that have already been migrated; (2) one command type that identifies data sectors that are currently in the process of being migrated; and (3) one command type that identifies data sectors are to be migrated. For commands of type (1), the I/O interface device 26 goes directly to $VD_1$ because these commands indicate that data is currently being written from the migration buffer to $VD_1$. For commands of type (2), the I/O interface device 26 goes either to $VD_0$ if the flag is asserted because this indicates that data is currently being read from $VD_0$; If the flag is deasserted, the I/O interface device 26 goes directly to the migration buffer because this indicates that data is currently being written to $VD_1$. For commands of type (3), the I/O interface device 26 goes directly to $VD_0$ because this command indicates that data is to be read from $VD_0$.

When data is being read from $VD_0$ or from the backup storage space, read media errors may occur. When a media error occurs, the address in the PD where the media error occurred is known. Preferably, the addresses in the PD of $VD_1$ that are affected and recorded in the DDF region. At the end of the current iteration of the data migration, a table in the DDF region of the PD in which the media error occurred is updated with an indication of the media error. Subsequently, the media errors are corrected and the indication of the media error contained in the DDF region of the PD is purged.

It should be noted that although the invention has been described with reference to illustrative embodiments, the invention is not limited to these embodiments. For example, although the invention has been described with reference to FIG. 2 for use in a system that does not require a hardware controller with NVRAM as shown in FIG. 1, the invention could be used in such a system to perform RAID level migration. The invention, however, provides a high level of performance without the need for a controller that has NVRAM. Also, although the illustrative embodiments describe examples of particular RAID level migrations, the invention is not limited with respect to the levels of RAID migration that are capable of being performed by the system. Those skilled in the art will understand the manner in which these and other modifications can be made to the embodiments described herein, and that all such modifications are within the scope of the invention.

The invention claimed is:

1. A Redundant Array of Inexpensive Disks (RAID) system having an ability to be migrated from a first RAID level to a second RAID level, the system comprising:

a server central processing unit (CPU) comprising processing logic that is configurable to execute a migration computer software program to migrate the system from the first RAID level to the second RAID level;

a server memory device comprising memory locations located at memory addresses, the server memory locations being configured to have electronic information written thereto and read therefrom, at least a portion of the memory addresses of the server memory device being allocated for use as a migration buffer;

a communications bus, the server CPU and the server memory device being connected to the bus;

an input/output (I/O) interface device, the I/O interface device being connected to the bus; and at least first and second physical disk drives (PDs) connected to the I/O interface device, each PD having a data storage region for storing data and a data disk format (DDF) storage region for storing configuration relating to the PD, the data storage region of each PD comprising a plurality of data storage addresses, the DDF storage region comprising one or more DDF storage addresses, the I/O interface device being configured to write to and read from the addresses of each of the PDs, wherein when the server CPU executes the migration computer software program, the server CPU configures the I/O interface device to migrate the RAID system from a first virtual disk drive ($VD_0$) comprising at least one of the first and second PDs to a second virtual disk drive device ($VD_1$) comprising at least one of the first and second PDs, wherein $VD_0$ corresponds to a first RAID level and $VD_1$ corresponds to a second RAID level, the first and second RAID levels being different from one another, and wherein $VD_0$ comprises the first PD and $VD_1$ comprises the first and second PDs and wherein migration parameters associated with the second PD are stored in unused data storage space of the data storage region of the second PD.

2. The RAID system of claim 1, wherein migration parameters associated with the first PD are stored in the DDF storage region of the first PD.

3. The RAID system of claim 2, wherein a copy of the migration parameters associated with the second PD are stored in the DDF storage region of the first PD.

4. The RAID system of claim 1, wherein $VD_0$ comprises the first and second PD and $VD_1$ comprises the first PD, and wherein migration parameters associated with the first and second PDs are stored in the respective DDF storage regions of the first and second PDs.

5. The RAID system of claim 1, wherein if the server CPU executes the migration computer software program to migrate the system from the first RAID level to the second RAID level, the server CPU sends at least one command to the I/O interface device that causes the I/O interface device to read data stored at addresses in the data storage region of the first PD and store the read data in the migration buffer.

6. The RAID system of claim 5, wherein after the I/O interface device has stored the data read from the first PD in the migration buffer, the server CPU causes the I/O interface device to read the data from the migration buffer and write the data to addresses in the data storage regions of the first and second PDs.

7. The RAID system of claim 6, wherein prior to the I/O interface device reading data stored at addresses in the data storage region of the first PD and storing the read data in the migration buffer, the I/O interface device determines whether a flag has been asserted, and wherein the I/O interface device only reads data stored at addresses in the data storage region of the first PD and stores the read data in the migration buffer if the I/O interface device determines that the flag has been asserted.

8. The RAID system of claim 7, wherein prior to the I/O interface device reading data from the migration buffer and writing the data to addresses in the data storage regions of the first and second PDs, the I/O interface device determines whether the flag has been deasserted, and wherein the I/O interface device only reads data from the migration buffer and writes the data to addresses in the data storage regions of the first and second PDs if the I/O interface device determines that the flag has been deasserted.

9. The RAID system of claim 4, wherein if the server CPU executes the migration computer software program to migrate the system from the first RAID level to the second RAID level, the server CPU sends at least one command to the I/O interface device that causes the I/O interface device to read data stored at addresses in the data storage regions of the first and second PDs and to store the read data in the migration buffer.

10. The RAID system of claim 9, wherein after the I/O interface device has stored the data read from the first and second PDs in the migration buffer, the server CPU causes the I/O interface device to read the data from the migration buffer and write the data to addresses in the data storage region of the first PD.

11. The RAID system of claim 10, wherein prior to the I/O interface device reading data stored at addresses in the data storage regions of the first and second PDs and storing the read data in the migration buffer, the I/O interface device determines whether a flag has been asserted, and wherein the I/O interface device only reads data stored at addresses in the data storage regions of the first and second PDs and stores the read data in the migration buffer if the I/O interface device determines that the flag has been asserted.

12. The RAID system of claim 11, wherein prior to the I/O interface device reading data from the migration buffer and writing the data to addresses in the data storage region of the first PD, the I/O interface device determines whether the flag has been deasserted, and wherein the I/O interface device only reads data from the migration buffer and writes the data to addresses in the data storage region of the first PD if the I/O interface device determines that the flag has been deasserted.

13. The RAID system of claim 1, wherein a portion of the data stored in the migration buffer is copied to a backup storage region, and wherein if power is lost during the migration process and later returns, then after the power is returned, the data copied to the backup storage region is retrieved from the backup storage region and written to addresses in the data storage region of each PD of $VD_1$.

14. A method for use in a Redundant Array of Inexpensive Disks (RAID) system for migrating the system from a first RAID level to a second RAID level, the method comprising:
  in a server central processing unit (CPU) of the RAID system, executing a migration computer software program to cause the RAID system to perform tasks associated with migrating the system from the first RAID level to the second RAID level;
  in a server memory device of the system having memory addresses configured for having electrical information written thereto and read therefrom, allocating at least a portion of the memory addresses of the server memory device for use as a migration buffer;
  sending one or more commands over a communications bus of the RAID system from the server CPU to an input/output (I/O) interface device of the RAID system, wherein the server CPU, the server memory device and the I/O interface device are connected to the bus; and
  in the I/O interface device, receiving the said one or more commands sent over the bus from the server CPU and executing the received commands to migrate from a first virtual disk drive ($VD_0$) to a second virtual disk drive ($VD_1$), $VD_0$ comprising at least one of a first and a second physical disk drive (PD), $VD_1$ comprising at least one of the first and second PDs, and wherein $VD_0$ corresponds to a first RAID level and $VD_1$ corresponds to a second RAID level, the first and second RAID levels being different from one another, wherein $VD_0$ comprises the first PD and $VD_1$ comprises the first and second PDs, and wherein while the I/O interface device is migrating $VD_0$ to $VD_1$, migration parameters associated with the second PD are stored in unused data storage space of the data storage region of the second PD.

15. The method of claim 14, wherein each PD includes a data storage region for storing data and a data disk format (DDF) storage region for storing configuration information relating to the PD, the data storage region of each PD comprising a plurality of data storage addresses, the DDF storage region comprising one or more DDF storage addresses, wherein the I/O interface device migrates from $VD_0$ to $VD_1$ by:
  reading data from data storage addresses of each PD of $VD_0$;
  writing the data read from each PD of $VD_0$ to the migration buffer;
  reading the data from the migration buffer; and
  writing the data read from the migration buffer to data storage addresses of each PD of $VD_1$.

16. The method of claim 15, wherein while the I/O interface device is migrating $VD_0$ to $VD_1$, migration parameters associated with the first PD are stored in the DDF storage region of the first PD.

17. The method of claim 16, wherein while the I/O interface device is migrating $VD_0$ to $VD_1$, a copy of the migration parameters associated with the second PD are stored in the DDF storage region of the first PD.

18. The method of claim 15, wherein $VD_0$ comprises the first and second PD and $VD_1$ comprises the first PD, and wherein while the I/O interface device is migrating $VD_0$ to $VD_1$, migration parameters associated with the first and second PDs are stored in the respective DDF storage regions of the first and second PDs.

19. The method of claim 15, further comprising:
  in the I/O interface device, prior to the I/O interface device reading data from data storage addresses of each PD of $VD_0$ and writing the data read from each PD of $VD_0$ to the migration buffer, determining whether a flag has been asserted, and wherein the I/O interface device only reads data from data storage addresses of each PD of $VD_0$ and writes the read data to the migration buffer if the I/O interface device determines that the flag has been asserted.

20. The method of claim 19, further comprising:
  in the I/O interface device, prior to the I/O interface device reading the data from the migration buffer and writing the data read from the migration buffer to data storage addresses of each PD of $VD_1$, the I/O interface device determines whether the flag has been deasserted, and wherein the I/O interface device only reads data from the migration buffer and writes the data to data storage addresses of each PD of $VD_1$ if the I/O interface device determines that the flag has been deasserted.

* * * * *